United States Patent
Creamer et al.

(10) Patent No.: US 6,735,294 B2
(45) Date of Patent: May 11, 2004

(54) METHOD AND APPARATUS FOR AN EXTENSIBLE MARKUP LANGUAGE (XML) CALENDAR-TELEPHONY INTERFACE

(75) Inventors: Thomas E. Creamer, Boca Raton, FL (US); Zygmunt A. Lozinski, Winchester (GB); Victor S. Moore, Boynton Beach, FL (US); Glen R. Walters, Hollywood, FL (US)

(73) Assignee: International Business Machines Corporation, Armonk, NY (US)

( * ) Notice: Subject to any disclaimer, the term of this patent is extended or adjusted under 35 U.S.C. 154(b) by 414 days.

(21) Appl. No.: 09/946,437

(22) Filed: Sep. 5, 2001

(65) Prior Publication Data

US 2003/0043989 A1 Mar. 6, 2003

(51) Int. Cl.[7] .................. H04M 3/432; H04M 3/46; H04M 7/00; G06F 9/44; G06F 15/16
(52) U.S. Cl. .............. 379/211.02; 345/963; 370/259; 379/201.03; 379/207.03; 379/207.15; 379/220.01; 709/217; 709/246; 717/114
(58) Field of Search .................. 345/963; 370/259; 379/201.01, 201.02, 201.03, 207.02, 207.03, 207.15, 211.02, 220.01; 709/217, 218, 219, 246; 717/114

(56) References Cited

U.S. PATENT DOCUMENTS

| | | | | |
|---|---|---|---|---|
| 5,428,678 A | * | 6/1995 | Fitzpatrick et al. | 379/201.02 |
| 5,493,692 A | * | 2/1996 | Theimer et al. | 455/26.1 |
| 5,872,841 A | * | 2/1999 | King et al. | 379/210.01 |
| 5,960,406 A | * | 9/1999 | Rasansky et al. | 705/9 |
| 6,016,478 A | * | 1/2000 | Zhang et al. | 705/9 |
| 6,064,977 A | * | 5/2000 | Haverstock et al. | 705/9 |
| 6,065,012 A | * | 5/2000 | Balsara et al. | 707/102 |
| 6,275,575 B1 | * | 8/2001 | Wu | 379/202.01 |
| 6,301,621 B1 | * | 10/2001 | Haverstock et al. | 709/246 |
| 6,373,817 B1 | * | 4/2002 | Kung et al. | 370/217 |
| 6,477,374 B1 | * | 11/2002 | Shaffer et al. | 455/445 |
| 6,601,016 B1 | * | 7/2003 | Brown et al. | 702/182 |
| 2002/0147004 A1 | * | 10/2002 | Ashmore | 455/414 |

OTHER PUBLICATIONS

"Method for Automatic Conference Calling by Caledar Event", IBM Technical Disclosure Bulletin, vol. 37, No. 1, Jan. 1, 1994, New York, USA, p. 679.*

"Calendar Scheduling Teleconference Communication Mechanism", IBM Technical Disclosure Bulletine, vol. 37, No. 3, Mar. 1, 1994, New York, USA, p. 561.*

"Method for Integration of Telephony Sevices . . . ", Jul. 10, 1999, Derwent.*

* cited by examiner

Primary Examiner—Harry S. Hong
(74) Attorney, Agent, or Firm—Akerman Senterfitt

(57) ABSTRACT

The present invention provides a method for routing a telephone call based on a calendar telephony interface. The method can include parsing telephone data associated with the telephone call, and determining from the parsed telephone data, a called telephone number and an identity of a person associated with the called number. The method further can include retrieving an XML formatted calendar entry associated with the identified person and extracting call control information from the XML formatted calendar entry. Accordingly, the telephone call based on the extracted routing information can be routed.

15 Claims, 2 Drawing Sheets

METHOD AND APPARATUS FOR AN EXTENSIBLE MARKUP LANGUAGE (XML) CALENDAR-TELEPHONY INTERFACE

BACKGROUND OF THE INVENTION

1. Technical Field

The present invention relates to the field of data formatting using markup languages, and more particularly, to a method and apparatus for an extensible markup language (XML) calendar-telephony interface.

2. Description of the Related Art

Electronic calendars have become popular and are commonly used to track daily events and activities. Electronic calendars (calendar) typically have telephone related information pertaining to the accessibility of a user. For example, a calendar can include an entry having a telephone number which indicates the contact information for a particular time of the day. A calendar-telephony interface allows a telephone application to utilize the interface to access telephone call related entries in a calendar and to use the accessed information to control the telephone call. For example, a telephony application can utilize a calendar-telephony interface to extract a telephone number from a calendar database and utilize that number to instruct, for example, a private branch exchange (PBX) how to terminate an incoming call.

However, entries in existing calendars are usually in free-form text areas which make recognition and identification of the entries difficult. Furthermore, if there is a change to the information contained in the database, then any application requiring access to the calendar database must be accordingly modified. This makes it very difficult to create and maintain existing calendar-telephony interface. Hence, what is needed is a more flexible approach for providing a calendar-telephony interface so that information contained in a calendar can be easily accessed and manipulated by telephony applications.

SUMMARY OF THE INVENTION

The invention provides a method and apparatus for routing a telephone call based on a calendar telephony interface. The method includes the steps of parsing telephone data associated with the telephone call and determining from the parsed telephone data, a called telephone number and an identity of a person associated with the called number. An XML formatted calendar entry associated with the identified person and be retrieved and call control information extracted from the XML formatted calendar entry. The telephone call can be routed based on the extracted routing information. The extracting step can include the step of parsing the XML formatted calendar entry to extract call control information located within the entries. The call control information can include but is not limited to a call forwarding instruction having a call forwarded number.

The invention further provides a method for integrating a telephony interface and a calendaring tool. The method includes the step of defining an XML element which represents a calendar entry in the calendar tool. A call routing instruction can be formatted with the defined XML element and the XML formatted call routing instruction can be inserted into an XML formatted document. The XML formatted document can include a calendar entry within the calendaring tool. The calendar entry can be stored in an associated database. An application program can be utilized for maintaining the database. The database can be accessible by the telephony application.

The invention further includes a system for providing an XML calendar-telephony interface. The system can include a calendar having XML formatted data including call control data, a telephony application for determining the routing of a call based on the XML formatted call control data and a TCAP interface for communicating the call control information between the telephony application and a telephone signaling device.

The invention also includes a system for providing an XML calendar-telephony interface, which includes a calendar having data fields for an entry formatted in XML format. The formatted entry can include call control information. A telephony interface can facilitate communication of the XML formatted data to a telephone network signaling device which can be utilized to control a telephony call feature. The telephony interface can further include an API for communicating call control information to the telephone network signaling device.

The invention also provides a machine readable storage having stored thereon, a computer program having a plurality of code sections, said code sections executable by a machine for causing the machine to perform the steps which were previously disclosed.

BRIEF DESCRIPTION OF THE DRAWINGS

There are presently shown in the drawings embodiments of which are presently preferred, it being understood, however, that the invention is not so limited to the precise arrangements and instrumentalities shown, wherein.

DETAILED DESCRIPTION OF THE INVENTION

The present invention provides a method and apparatus for providing an XML calendar-telephony interface. A calendar-telephony interface permits interchange of information between an electronic calendar and a telephony call control application. A telephony call control application (telephony application) can be interfaced to a PSTN through a TCAP interface utilizing, for example, Java APIs for Integrated Networks (JAIN). JAIN provides standardized open APIs which can be utilized to build and integrated services and components for communications networks such as the PSTN. In response to a call request initiated in the PSTN by a calling party, the telephony application can determine from callerID information associated with the call request, the identity of the called party. This can include the called party's name or identity. Upon determination of the called party's identity, the telephony control application can access a calendaring tool from which XML formatted information pertaining to the identified called party can be extracted.

Notably, in one aspect of the invention, the extracted information can contain one or more call routing instructions. In this case, the telephony application can provide the extracted call routing information to a routing device having a TCAP interface, which is necessary for communicating telephone signaling information during call routing.

For example, the call routing information can be a call forwarding instruction. In this example, an XML formatted entry in the calendaring tool can specify that calls received during a given period are to be forwarded to a predetermined telephone number. If a call initiated by a caller to the called party is received by the telephony application during the given period, and the called party has a calendar entry with a call forwarding instruction, the telephony application can extract the specified forwarding number from the XML formatted calendar entry and can provide the forwarding number to a PSTN routing device via the TCAP interface. The PSTN routing device can accordingly route the call to the forwarded telephone number.

Figure 1:
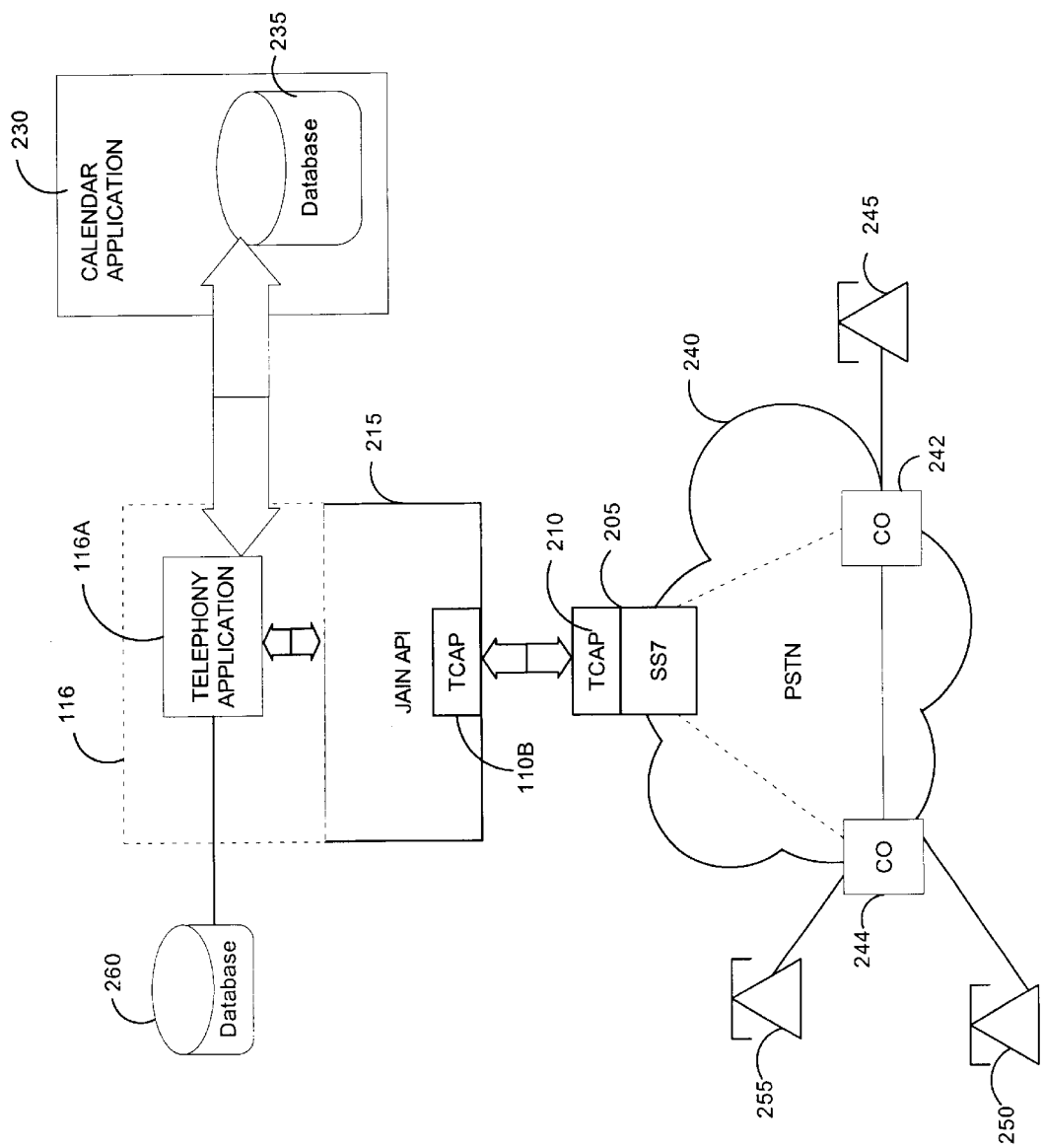
FIG. 1 is an exemplary system utilizing a calendar-telephony interface in accordance with the inventive aspects.

FIG. 1 is an exemplary system utilizing a calendar-telephony interface. Referring to FIG. 1, PSTN 240 utilizes a SS7 signaling device 205 which has a TCAP interface 210. The SS7 signaling device 205 of PSTN 240 utilizes common channel signaling to handle call routing throughout the PSTN 240. SS7 is well known in the art of circuit switched telephony and the routing functions handled by SS7 interface include call management, for instance, call setup, call maintenance, call termination and network management functions. In a typical call scenario, a call initiated by a calling party using telephone 245 and destined to a called party, for example telephone 255, can be setup, maintained and terminated by the SS7 signaling device 205. Hence, all the signaling associated with the "setting up" and "tearing down" of the voice trunk which is used to carry voice traffic, can be handled by the SS7 signaling device 205.

TCAP interface 210 of SS7 signaling device 205 can provide connectivity to, for example, a platform with a JAIN API 215 having a corresponding TCAP interface 110B. TCAP interface 110B permits communication between external applications 116, for example, telephony application 116A, and signaling device 205 via the TCAP interface 210. Consequently, external applications 116 utilizing the open API offered by JAIN can provide enhanced call services to the telephones 245, 250, 255 in PSTN 240.

The PSTN 240 provides local access service to telephones 245, 250, 255 via the central office (CO) 242, 244. Particularly, CO switch 242 provides local access service to telephone 245 and CO switch 244 provides local access service to telephones 255 and 250. In order to provide certain types of enhanced telephony services to the telephones 245, 250, 255 in PSTN 240, telephony application 116A can acquire data from an application, such as, a calendar application 230 which has an associated database 235. Call forwarding, call transfer, call screening, and call rejection are exemplary enhanced services and data associated with these services can be stored in database 235.

External applications 116, in particular telephony application program 116A, can be used to offer enhanced routing functions that can control the setup, maintenance and termination of the call initiated by calling party using a telephone such as 245. External applications 116, for example telephony call control application 116A, can acquire information from a database of a calendar application 230. While the telephony application can acquire information from a calendar application database, it should readily be understood that the telephony application can alternately request the information from the calendar application.

Application calendar program 230 is an application program used to manage calendar entries which can be stored in a database 235. Calendar program 230 can facilitate task such as entering data that can be stored in an XML format in database 235. The application calendar program 230 can facilitate other tasks, which can include routine database management functions such as viewing, deleting and updating records stored in database 235. The calendar application can be a "standalone" calendar program or it can be part of a communication suite. Alternately, it can be an external device such as a PDA.

Figure 2:
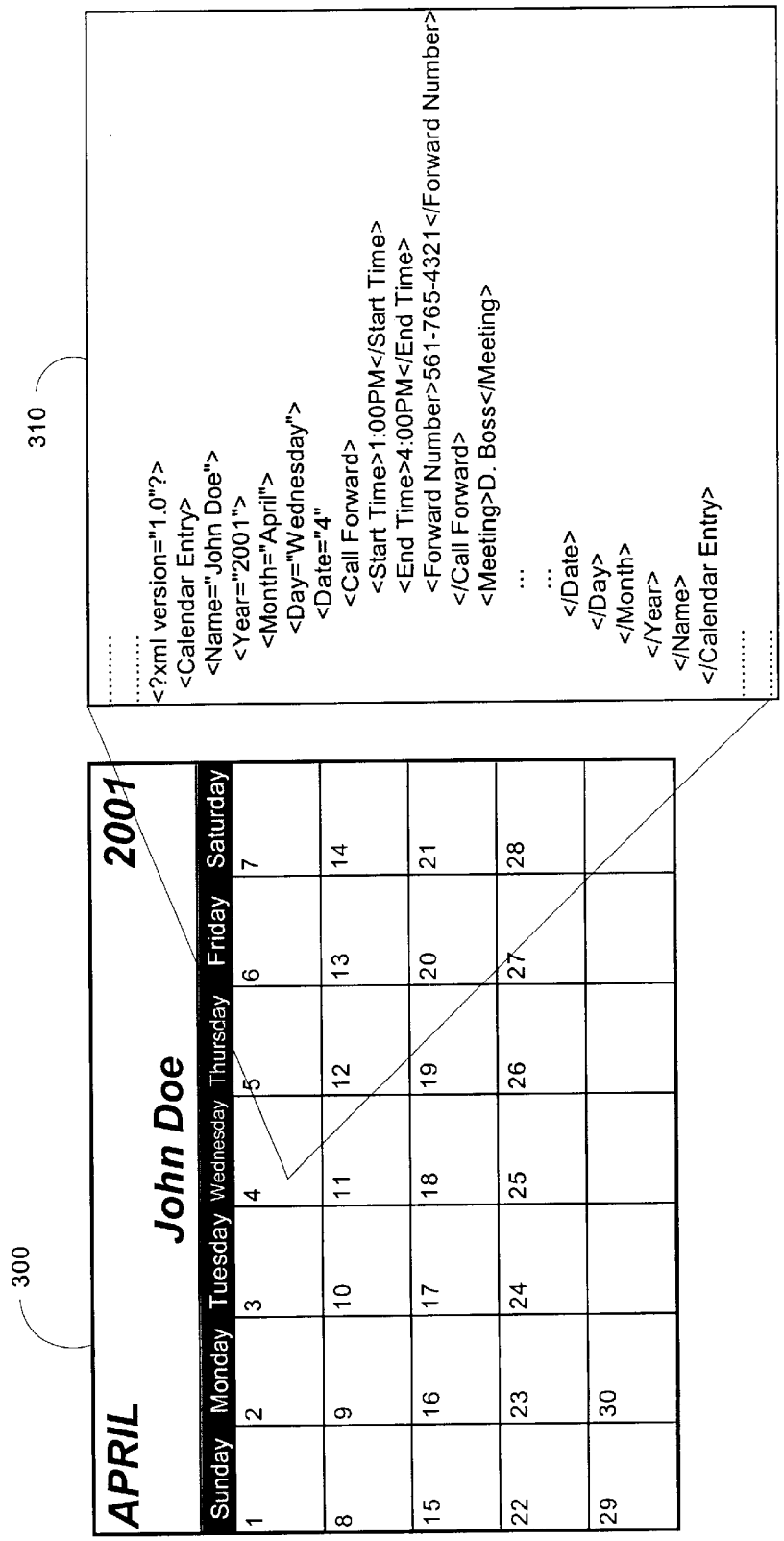
FIG. 2 illustrates an exemplary calendar having an XML formatted entry.

FIG. 2 illustrates an exemplary calendar having an entry formatted in XML. Calendar 300 contains personal calendar entries for John Doe. Sample entry 310 contains calendar information which has been formatted using XML format. Sample entry 310 contains data for Wednesday Apr. 4, 2001 for John Doe. The sample XML formatted entry 310 indicates that calls received between the hours of 1:00 pm and 4:00 pm are to be forwarded to 561-765-4321. The XML formatted calendar information 310 can be stored in database 235 and made accessible to calendar application program 230 and telephony application 116A.

In accordance with the inventive aspects, a call can be placed by a calling party 245 to a called party 255. Upon dialing the digits of the called party 255, the SS7 interface 205 can determine how the call should be routed. A determination of how to route the call can be made by communicating the dialed digits to telephone application 116A through the common TCAP interfaces 210 and 110B respectively. Upon receipt of the dialed digits, the telephony application 116A can determine the identity of the called party 255 by searching for a name corresponding to the dialed digits in a name resolution database 260. Upon determination of the identity of the called party, the telephony application can extract any XML formatted information pertaining to call handling for the identified party from the database 235. The call handling information can then be communicated to the SS7 interface 205 through the TCAP interface 110B and 210. The SS7 interface can route the call accordingly.

For example, a subscriber using telephone 245 which has a directory number (DN) of 561-123-9876 calls John Doe at telephone 255 which has a (DN) of 561-765-4455. Central office switch 242 is the originating central office switch and central office switch 244 is the terminating central office switch. The name resolution database 260 has an entry corresponding to 561-123-9876 identified to the name John Doe. Prior to placing the call, the calling telephone 245 is on-hook. Upon being placed off-hook, a dial tone is provided by the originating CO switch 242 to the calling telephone 245. The dialed digits are then sent to the SS7 signaling device 205. Telephony application 116A which communicates with the open JAIN API having a TCAP interface 110B, can capture the dialed digits through the common TCAP interface 210. Upon receiving the dialed digits, the telephone application 116A can lookup the name corresponding to the called number 561-765-4455 in the name resolution database 260. Based on the lookup, the name John Doe corresponds to the called number 561-765-4455 in the name resolution database.

Upon determination that John Doe is being called, the telephony application 116A can locate the database 235 containing XML formatted calendar information for John Doe. The XML formatted information can be parsed in order to determine if and how the call to John Doe should be routed. On parsing the XML formatted information 310 for John Doe, call routing information will be found. Specifically, if the call was received between 1:00 pm and 4:00 pm on Apr. 4th, 2001, then the call should be forwarded to telephone 250 which has the DN 561-765-4321. The telephony application can extract the parsed forwarding DN 561-765-4321 and send it to the SS7 signaling device 205 via the TCAP interface 110B, 210. The SS7 signaling device 205 can send the forwarding DN (called a forwarding address) to the terminating CO switch 244. Terminating CO switch 244 alerts telephone 250 of the incoming call by sending it a ringing signal that causes the telephone 250 to ring. Simultaneously, a feedback signal is sent to the originating CO switch 242 which causes a ringing tone to be heard at the calling telephone 245. Upon the forwarded telephone 250 being placed off hook (call answered by a subscriber), the terminating CO switch 244 causes the ringing tone and the ringing signal to cease, and a voice trunk gets established between the originating CO switch 242 and the terminating CO switch 244. At this point, the calling telephone 245 and the forwarded telephone 250 are now connected.

It should be apparent that although the invention is described using call forwarding as the call routing instruction, other calling features may be utilized. For example, call screening, call rejection and call transfer. Moreover, it should be readily understood that although the foregoing description utilized a circuit switched system to illustrate the inventive arrangements, the invention is not so limited. In fact, the invention can be applicable to a packet switched network. For example, the SS7 signaling device 205 can be connected to a Media Gateway Controller (MEGACO) via a MTP2 interface. This allows packet switched data to be translated to circuit switched data and vice versa.

The present invention can be realized in hardware, software, or a combination of hardware and software. A method and apparatus for an XML calendar-telephony interface according to the present invention can be realized in a centralized fashion in one computer system, or in a distributed fashion where different elements are spread across several interconnected computer systems. Any kind of computer system, or other apparatus adapted for carrying out the methods described herein, is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

What is claimed is:

1. A method for routing a telephone call based on a calendar telephony interface, comprising:
   parsing telephone data associated with the telephone call;
   determining from said parsed telephone data, a called telephone number and an identity of a person associated with said called number;
   retrieving an XML formatted calendar entry associated with said identified person;
   extracting call control information from said XML formatted calendar entry; and
   routing said telephone call based on said extracted routing information.

2. The method according to claim 1, wherein said extracting step comprises parsing said XML formatted calendar entry to extract call control information in said entries.

3. The method according to claim 2, wherein said call control information is a call forwarding instruction having a call forwarded number.

4. A method for integrating a telephony interface and a calendaring tool, comprising:
   defining an XML element representing a calendar entry in the calendar tool;
   formatting a call routing instruction with said defined XML element; and
   inserting the formatted call routing instruction in an XML document, said XML document forming a calendar entry in the calendaring tool.

5. The method according to claim 4, wherein the said calendar entry is stored in a database, said database comprising an application program for maintaining said database.

6. The method according to claim 5, wherein said database is accessible by the telephony application.

7. A system for providing XML calendar-telephony interface, comprising:
   a calendar having XML formatted data including call control data;
   a telephony application for determining the routing of a call based on said XML formatted call control data; and
   a TCAP interface for communicating said call control information between said telephony application and a telephone signaling device.

8. A system for providing an XML calendar-telephony interface, comprising:
   a calendar having data fields for an entry formatted in XML format, said formatted entry comprising call control information; and
   a telephony application communicatively interfaced to said calendar, said telephony application for communicating said XML formatted data to a telephone signaling device used to control a telephony call feature.

9. The system according to claim 8, wherein said telephony interface further comprises an API for communicating call control information to said telephone network signaling device.

10. A machine readable storage having stored thereon, a computer program having a plurality of code sections, said code sections executable by a machine for causing the machine to perform the steps of:
    parsing telephone data associated with the telephone call, said parsing step for routing a telephone call based on a calendar telephony interface;
    determining from said parsed telephone data, a called telephone number and an identity of a person associated with said called number;
    retrieving an XML formatted calendar entry associated with said identified person;
    extracting call control information from said XML formatted calendar entry; and
    routing said telephone call based on said extracted routing information.

11. The machine readable storage according to claim 10, wherein said extracting step comprises parsing said XML formatted calendar entry to extract call control information in said entries.

12. The machine readable storage according to claim 11, wherein said call control information is a call forwarding instruction having a call forwarded number.

13. A machine readable storage for integrating a telephony interface and a calendaring tool, comprising:

defining an XML element representing a calendar entry in the calendar tool;

formatting a call routing instruction with said defined XML element; and inserting the formatted call routing instruction in an XML document, said XML document forming a calendar entry in the calendaring tool.

14. The machine readable storage according to claim 13, wherein said calendar entry is stored in a database, said database comprising an application program for maintaining said database.

15. The machine readable storage according to claim 14, wherein said database is accessible by the telephony application.

* * * * *